March 31, 1931.  W. BENIEN ET AL  1,799,035
GRASS AND WEED BURNER
Original Filed March 1, 1928  2 Sheets-Sheet 1

Inventor
W. Benien & E. Gislar.
By
Attorney

March 31, 1931. W. BENIEN ET AL 1,799,035
GRASS AND WEED BURNER
Original Filed March 1, 1928  2 Sheets-Sheet 2
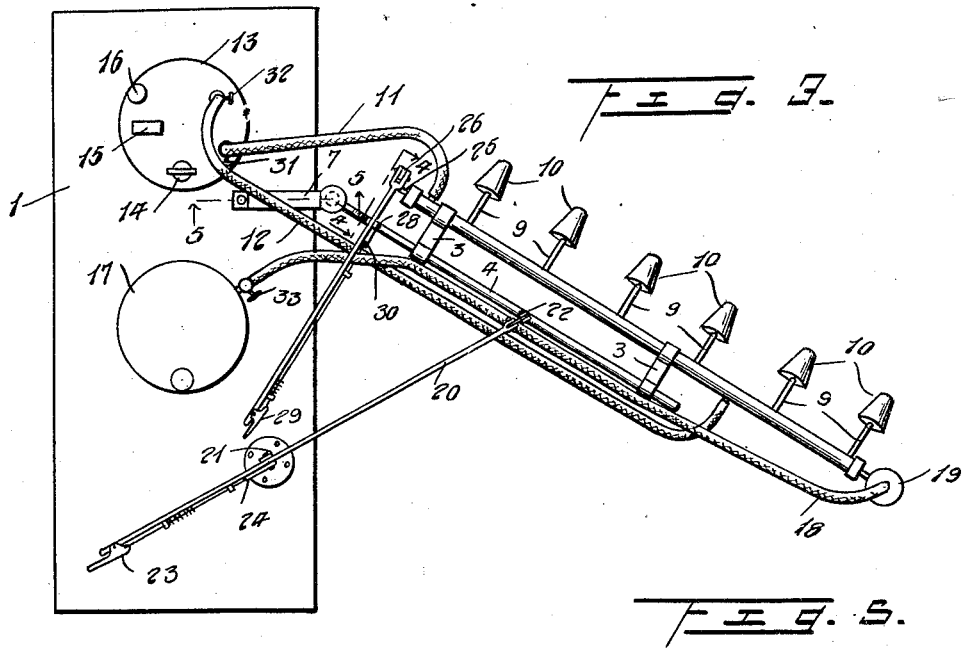
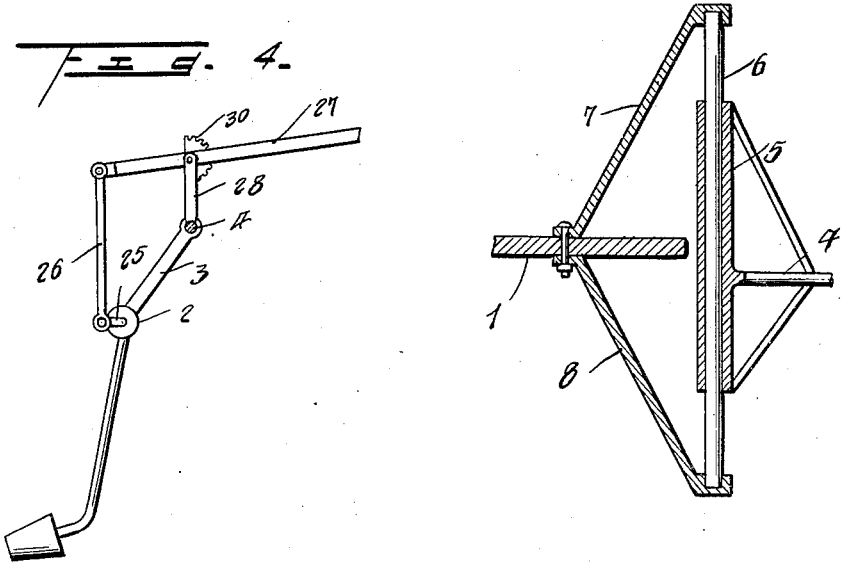
Inventor
W. Benien & E. Gislar.
By [signature]
Attorney Patented Mar. 31, 1931

1,799,035

UNITED STATES PATENT OFFICE

WILLIAM BENIEN AND EVERETT GISLAR, OF LINCOLN, KANSAS

GRASS AND WEED BURNER

Substitute for application Serial No. 258,408, filed March 1, 1928. This application filed November 13, 1930. Serial No. 495,525.

The invention relates to devices for destroying grass and weeds adjacent to roadways, and has for its object the provision of an assembly adapted to be mounted on a truck or other wheeled support for transportation and having a burner including a plurality of torches supplied with liquid fuel from containers on a platform included in the assembly with means for adjusting the burner and torches vertically and also for journaling the burner to adjust the torches relatively to the supply tube of the burner.

The invention also has for its object the provision of means for sprinkling water adjacent to the area burned by the torches to prevent ignition of grass or weeds outside of the grass or weeds affected directly by the torches.

Figure 1:
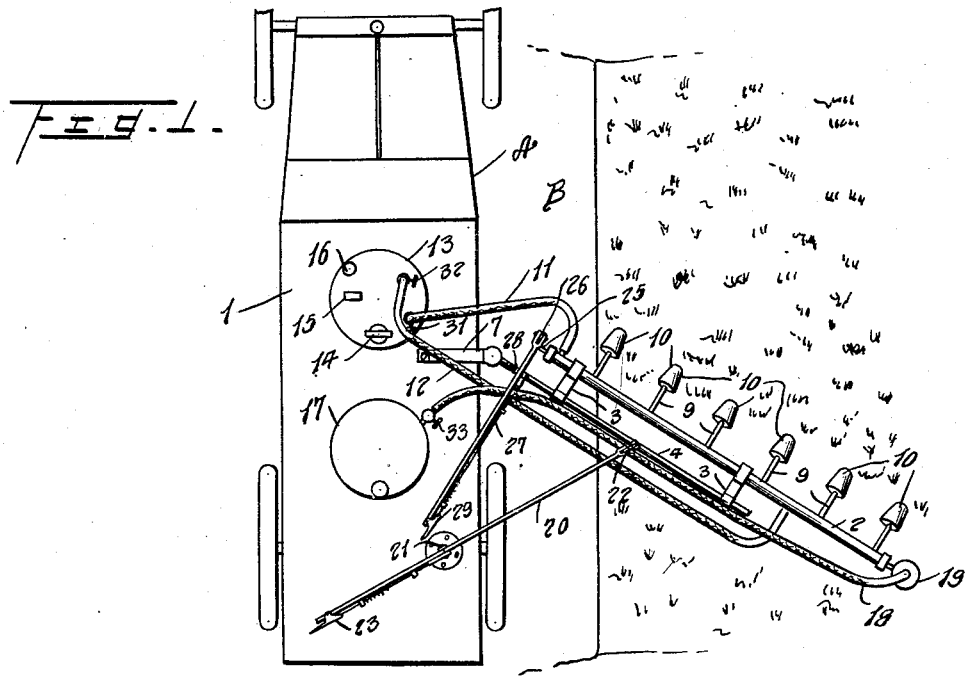
Figure 2:
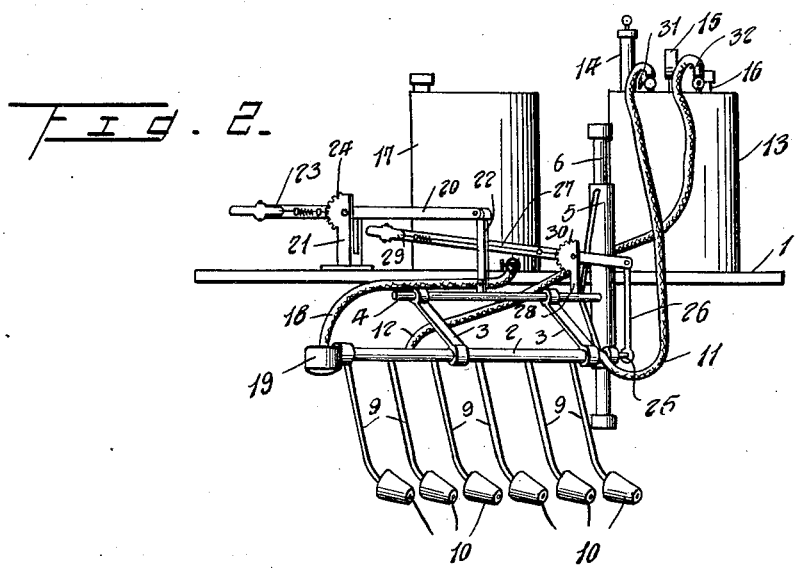

The invention will be described in detail hereinafter and will be found illustrated in the accompanying drawings, in which Figure 1 is a top plan view of the grass and weed burner showing it mounted on a truck, Figure 2 is a side view in elevation of the assembly, Figure 3 is a top plan view of the assembly for application to any means of transportation, Figure 4 is a sectional detail on a plane indicated by the line 4—4 of Figure 3, and Figure 5 is a sectional detail on a plane indicated by the line 5—5 of Figure 3.

In the drawings similar reference characters are used to designate corresponding parts throughout the several views.

The improved grass and weed burner is carried by a platform 1 that is adapted to be mounted on a motor truck shown at A in Figure 1, or may be supported on any other means of transportation including a flat railroad car. The device is adapted to destroy undesirable vegetation, such for instance as grass or weeds along the sides of the right of way of a vehicle highway, as shown at B in Figure 1, or of a railroad when the device is mounted on a railroad car as heretofore stated. The burner comprises a tubular member 2 that is journaled in the ends of supporting bearing brackets 3 that are fixedly secured to an arm 4 extending laterally from a tubular member 5 slidably mounted on a guide rod 6 that is terminally supported by means of brackets 7 and 8 secured to the platform 1. 9 designates branch tubes communicating with the tubular member 2 and having torches 10 of any suitable type mounted thereon, and the tubular member 2 is connected by means of flexible hose 11 and 12 with a supply tank 13 mounted on the platform 1, hose 11 being connected with the end of the tubular member 2, while the hose 12 is connected with the tubular member at a point intermediate of the ends of the tube 2 as to evenly distribute fuel to the torches 10.

A supply tank 13 is furnished with an air pump 14 to create a pressure in the tank to drive the fuel therefrom to supply the torches 10, 15 indicating a pressure gage, and 16 a filling nozzle for the tank.

17 indicates a water reservoir mounted on the platform 1 and connected by means of a flexible hose 18 with a nozzle 19 secured to and movable with the tubular member 2.

The burner is adapted for vertical adjustment, and 20 indicates a lever fulcrumed on support 21 carried by the platform 1, and connected by means of a link 22 with the arm 4, 23 indicating a thumb latch on the lever 20, and 24 a notched segment carried by the support 21 to hold the lever 20 and the burner in adjusted position. The torches 10 are also adapted to be moved through an arc for regulating the direction of the flame therefrom by rotating the tubular member 2 in the bearing brackets 3, said tubular member being provided with a crank arm 25 that is connected by a link 26 to the lever 27 fulcrumed on a supporting member 28 carried by the arm 4. 29 indicates a latching means on lever 27 and 30 a notched segment on the support 28 coacting with said latching means to hold the lever 27 in adjusted position. As the nozzle 19 is mounted to rotate with the tubular member 2 it will be apparent that when the tubular member 2 is in the position shown in the drawings that the water discharged therefrom will be directed downwardly along the edge of the swath burned by the torches, and when the tubular member 2 is rotated in its journal to lift the torches 10, the spray from the nozzle 19 is thrown in advance of the torches to extinguish the flame of burning grass and weeds when the burner is extinguished. The connections for the hose lines 11 and 12 are provided with valves 31 and 32 to regulate the supply of fuel to the burner, and the hose line 18 leads from a valved connection on the tank 17 as shown at 33.

What is claimed is:—

1. A weed and grass burner, comprising a supporting member, brackets secured to said supporting member, a substantially vertical guide rod supported by said brackets, a tubular member slidably mounted on said guide rod, an arm extending from said tubular member, a lever fulcrumed on said supporting member and operatively connected to said arm, and a burner supported on said arm.

2. A weed and grass burner, comprising a platform, brackets on said platform, a substantially vertically disposed guide rod supported by said brackets, a tubular member slidably mounted on said guide rod, an arm extending from said tubular member, a lever fulcrumed on the platform and operatively connected to said arm, a burner tube rotatably supported from said arm, a crank arm on said burner tube, and another lever fulcrumed on said platform and operatively connected to said crank arm.

In testimony whereof we affix our signatures.

WILLIAM BENIEN.
EVERETT GISLAR.